US010990773B1

(12) United States Patent
Herbel et al.

(10) Patent No.: US 10,990,773 B1
(45) Date of Patent: Apr. 27, 2021

(54) POLYMORPHIC PROFILES

(71) Applicant: SOCKET MOBILE, INC., Newark, CA (US)

(72) Inventors: Gerald Roy Herbel, Milpitas, CA (US); Leonard Ott, Livermore, CA (US); Vincent J. Coli, Mountain View, CA (US)

(73) Assignee: Socket Mobile, Inc., Newark, CA (US)

( * ) Notice: Subject to any disclaimer, the term of this patent is extended or adjusted under 35 U.S.C. 154(b) by 0 days.

(21) Appl. No.: 16/119,820

(22) Filed: Aug. 31, 2018

Related U.S. Application Data

(60) Provisional application No. 62/553,109, filed on Aug. 31, 2017.

(51) Int. Cl.
| | |
|---|---|
| *G06K 7/10* | (2006.01) |
| *H04W 4/80* | (2018.01) |
| *G06F 16/13* | (2019.01) |
| *H04L 29/08* | (2006.01) |
| *H04W 76/14* | (2018.01) |

(52) U.S. Cl.
CPC ......... *G06K 7/10386* (2013.01); *G06F 16/13* (2019.01); *H04L 67/303* (2013.01); *H04W 4/80* (2018.02); *H04W 76/14* (2018.02)

(58) Field of Classification Search
CPC .................................................... G06K 7/103
See application file for complete search history.

(56) References Cited

U.S. PATENT DOCUMENTS

| | | | |
|---|---|---|---|
| 8,453,232 B1 | 5/2013 | Gallagher et al. | |
| 9,706,493 B2* | 7/2017 | Kvetny | .................. H04L 67/28 |
| 9,924,272 B2* | 3/2018 | Bang | ....................... H04R 3/04 |
| 9,937,305 B2* | 4/2018 | Morrison | .......... A61M 15/0001 |
| 2016/0085538 A1 | 3/2016 | Finch | |
| 2018/0332434 A1* | 11/2018 | Kulkarni | ................ H04L 67/22 |

* cited by examiner

*Primary Examiner* — K. Wong
(74) *Attorney, Agent, or Firm* — PatentVentures; Bennett Smith; Korbin Van Dyke

(57) ABSTRACT

A peripheral device at startup selectively activates one of a plurality of connection profiles for low-energy communication with a central device. The profiles determine the behavior of the peripheral device as viewed by the central device, such as a selected one of a HID, a Reader/Scanner, and a PC/SC-like device. The activated profile is selected based on connection profile state maintained across power cycle events and in view of special button combination events at startup. According to embodiment, the profile can also be selected (in conjunction with a reboot) as commanded under select circumstances by an application running on the central device or based on the peripheral reading a configuration card. According to embodiment, the activated profile corresponds to selected sub-portions of a unified database file of the peripheral device. The unified database includes profile components enabling activation of a selected one a plurality of low-energy communication profiles.

24 Claims, 4 Drawing Sheets

POLYMORPHIC PROFILES

CROSS REFERENCE TO RELATED APPLICATIONS

To the extent permitted by the type of the instant application, this application incorporates by reference for all purposes the following applications, all commonly owned with the instant application not later than the effective filing date of the instant application:

U.S. Provisional Application Ser. No. 62/553,109, filed Aug. 31, 2017, first named inventor Gerald Roy HERBEL, and entitled POLYMORPHIC PROFILES.

BACKGROUND

Field: Advancements in peripheral device wireless connection profiles are needed to provide improvements in cost, profitability, performance, efficiency, and utility of use.

Related Art: Unless expressly identified as being publicly or well known, mention herein of techniques and concepts, including for context, definitions, or comparison purposes, should not be construed as an admission that such techniques and concepts are previously publicly known or otherwise part of the prior art. All references cited herein (if any), including patents, patent applications, and publications, are hereby incorporated by reference in their entireties, whether specifically incorporated or not, for all purposes.

Improvements in peripheral device wireless connection profiles are needed to improve user and developer experience by enabling selective feature accessibility and utilization; enhance reliability, availability, and serviceability (RAS); and facilitating future feature extensibility.

SYNOPSIS

The invention may be implemented in numerous ways, e.g. as a process, an article of manufacture, an apparatus, a system, a composition of matter, and a computer readable medium such as a computer readable storage medium (e.g., media in an optical and/or magnetic mass storage device such as a disk, an integrated circuit having non-volatile storage such as flash storage), or a computer network wherein program instructions are sent over optical or electronic communication links. The Detailed Description provides an exposition of one or more embodiments of the invention that enable improvements in cost, profitability, performance, efficiency, and utility of use in the field identified above. The Detailed Description includes an Introduction to facilitate understanding of the remainder of the Detailed Description. The Introduction includes Example Embodiments of one or more of systems, methods, articles of manufacture, and computer readable media in accordance with concepts described herein. As is discussed in more detail in the Conclusions, the invention encompasses all possible modifications and variations within the scope of the issued claims.

A peripheral device at startup selectively activates one of a plurality of connection profiles for low-energy communication with a central device. The profiles determine the behavior of the peripheral device as viewed by the central device, such as a selected one of a HID, a Reader/Scanner, and a PC/SC-like device. The activated profile is selected based on connection profile state maintained across power cycle events and in view of special button combination events at startup. According to embodiment, the profile can also be selected (in conjunction with a reboot) as commanded under select circumstances by an application running on the central device or based on the peripheral reading a configuration card. According to embodiment, the activated profile corresponds to selected sub-portions of a unified database file of the peripheral device. The unified database includes profile components enabling activation of a selected one a plurality of low-energy communication profiles.

An example of the low-energy radio technology is Bluetooth Low Energy (e.g. Bluetooth version 4.2). Examples of the peripheral device are a Near Field Communication (NFC) tag reader and/or writer, a Radio Frequency IDentification (RFID) reader and/or writer, a barcode (e.g. optical barcode) scanner, and any other type of device usable in conjunction with a central device. Examples of a central device are a smartphone, a tablet computer, a laptop computer, and any other type of device usable in conjunction with a peripheral device.

DETAILED DESCRIPTION

Figure 1:
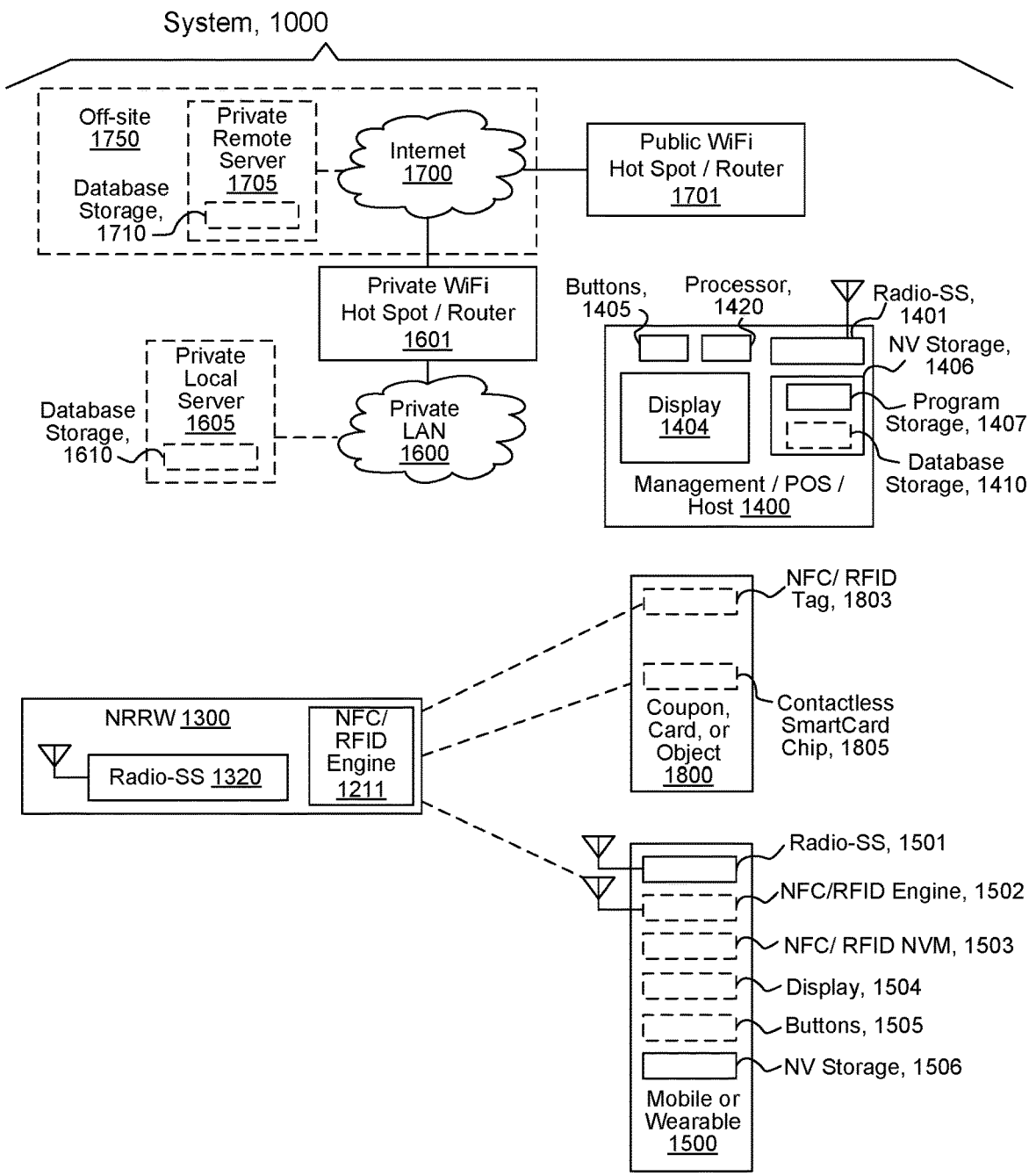
FIG. 1 illustrates, via a structural system perspective, embodiments of a peripheral device employing wireless connection profiles.

A detailed description of one or more embodiments of the invention is provided below along with accompanying figures illustrating selected details of the invention. The invention is described in connection with the embodiments. The embodiments herein are understood to be merely exemplary, the invention is expressly not limited to or by any or all of the embodiments herein, and the invention encompasses numerous alternatives, modifications, and equivalents. To avoid monotony in the exposition, a variety of word labels (including but not limited to: first, last, certain, various, further, other, particular, select, some, and notable) may be applied to separate sets of embodiments; as used herein such labels are expressly not meant to convey quality, or any form of preference or prejudice, but merely to conveniently distinguish among the separate sets. The order of some operations of disclosed processes is alterable within the scope of the invention. Wherever multiple embodiments serve to describe variations in process, method, and/or program instruction features, other embodiments are contemplated that in accordance with a predetermined or a dynamically determined criterion perform static and/or dynamic selection of one of a plurality of modes of operation corresponding respectively to a plurality of the multiple embodiments. Numerous specific details are set forth in the following description to provide a thorough understanding of the invention. The details are provided for the purpose of example and the invention may be practiced according to the claims without some or all of the details. For the purpose of clarity, technical material that is known in the technical fields related to the invention has not been described in detail so that the invention is not unnecessarily obscured.

Introduction

This introduction is included only to facilitate the more rapid understanding of the Detailed Description; the invention is not limited to the concepts presented in the introduction (including explicit examples, if any), as the paragraphs of any introduction are necessarily an abridged view of the entire subject and are not meant to be an exhaustive or restrictive description. For example, the introduction that follows provides overview information limited by space and organization to only certain embodiments. There are many other embodiments, including those to which claims will ultimately be drawn, discussed throughout the balance of the specification.

Example Embodiments

In concluding the introduction to the detailed description, what follows is a collection of example embodiments, including at least some explicitly enumerated as "ECs" (Example Combinations), providing additional description of a variety of embodiment types in accordance with the concepts described herein; these examples are not meant to be mutually exclusive, exhaustive, or restrictive; and the invention is not limited to these example embodiments but rather encompasses all possible modifications and variations within the scope of the issued claims.

EC1) A method of operating a low-energy radio peripheral, the method comprising:
  in response to a startup event, monitoring by a processing element of the low-energy radio peripheral for a special buttons event;
  subsequent to the monitoring, selectively modifying low-energy radio connection profile state bits maintained by the processing element,
    wherein during the selectively modifying, the low-energy radio connection profile state bits are modified in response to a detection of a special buttons event, and
    wherein during the selectively modifying, the low-energy radio connection profile state bits are not modified in response to the absence of a special buttons event during the monitoring; and
  subsequent to the selectively modifying, in accordance with the low-energy radio connection profile state bits, activating a corresponding generic attribute profile table in a low-energy radio engine of the low-energy radio peripheral.

EC2) The method of EC1, wherein the startup event corresponds to power-on of the low-energy radio peripheral.

EC3) The method of EC1, wherein the startup event corresponds to reboot of the low-energy radio peripheral.

EC4) The method of EC1, wherein the processing element comprises an MCU.

EC5) The method of EC1, wherein:
  the low-energy radio peripheral comprises a BLE peripheral,
  the low-energy radio connection profile state bits comprise BLE connection profile state bits,
  the low-energy radio engine comprises a BLE engine, and
  the generic attribute profile table comprises a BLE GATT table.

EC6) The method of EC5, wherein the BLE peripheral is compatible with at least version 4.2 of the Bluetooth Specification.

EC7) The method of EC5, wherein the BLE radio engine is compatible with one or more versions of a Bluetooth Low Energy radio engine.

EC8) The method of EC1, wherein the low-energy radio peripheral comprises a BLE peripheral.

EC9) The method of EC8, wherein the BLE peripheral is compatible with at least version 4.2 of the Bluetooth Specification.

EC10) The method of EC8, wherein the low-energy radio connection profile state bits comprise BLE connection profile state bits.

EC11) The method of EC8, wherein the low-energy radio engine comprises a BLE engine.

EC12) The method of EC8, wherein the generic attribute profile table comprises a BLE GATT table.

EC13) The method of EC5, wherein the activated GATT table corresponds to an HID BLE connection profile.

EC14) The method of EC13, wherein a wireless external host connects with the BLE peripheral using the HID BLE connection profile.

EC15) The method of EC14, wherein the wireless external host is a smartphone.

EC16) The method of EC14, wherein the wireless external host is a selected one of a smartphone, a tablet, a desktop computer, and a server.

EC17) The method of EC14, wherein the BLE peripheral appears as a keyboard to the wireless external host.

EC18) The method of EC5, wherein the activated GATT table corresponds to a non-HID BLE connection profile.

EC19) The method of EC5, wherein the activated GATT table corresponds to a BLE connection profile describing one or more of an RFID Scanner and a PC/SC-Like device.

EC20) The method of EC5, wherein the activated GATT table corresponds to a combination BLE connection profile describing an RFID Scanner and a PC/SC-Like device.

EC21) The method of EC20, wherein the combination BLE connection profile comprises at least one BLE characteristic corresponding to the RFID Scanner and at least one BLE characteristic corresponding to the PC/SC-Like device.

EC22) The method of EC21, wherein a BLE peripheral application executing on a wireless host external to the BLE peripheral connects with the BLE peripheral using the combination BLE connection profile.

EC23) The method of EC22, wherein the application is enabled to treat the BLE peripheral as a selected one of an RFID Scanner and a PC/SC-Like device via connecting to a respectively corresponding BLE characteristic.

EC24) The method of EC22, wherein the BLE peripheral operates as an RFID Scanner when the application connects to the at least one BLE characteristic corresponding to the RFID Scanner.

EC25) The method of EC22, wherein the BLE peripheral operates as a PC/SC-Like device when the application connects to the at least one BLE characteristic corresponding to the PC/SC-Like device.

EC26) The method of EC5, wherein after a reboot, the BLE peripheral operates in a particular BLE connection profile in response to a BLE peripheral application executing on a wireless host external to the BLE peripheral and specifying the particular BLE connection profile prior to the reboot.

EC27) The method of EC1, wherein the low-energy radio connection profile state bits are modified to toggle the low-energy radio connection profile state between a first state and a second state.

EC28) The method of EC1, wherein the low-energy radio connection profile state bits are modified to advance by one state in a predetermined circular sequence of a plurality of low-energy connection profile states.

EC29) The method of EC28, wherein the number of low-energy connection profile states is 2.

EC30) The method of EC28, wherein the number of low-energy connection profile states is 3.

EC31) The method of EC1, wherein the low-energy radio connection profile state bits are maintained in configuration registers of the processing element.

EC32) The method of EC1, wherein the low-energy radio peripheral is handheld.

EC33) The method of EC1, wherein the low-energy radio peripheral is enabled to read one or more of wireless tags and optical scan targets.

EC34) The method of EC33, wherein the wireless tags include one or more of NFC tags and RFID tags.

EC35) The method of EC33, wherein the optical scan targets include one or more of QR codes and linear barcodes.

EC36) The method of EC1, wherein reflashing the low-energy radio engine is not required to change between connection profiles.

EC37) The method of EC5, wherein the BLE GATT table is a polymorphic GATT table.

EC38) The method of EC37, wherein the polymorphic GATT table comprises portions corresponding to one or more of an HID, an RFID Scanner, and a PC/SC-Like device.

EC39) The method of EC37, wherein the polymorphic GATT table comprises portions corresponding to an HID, an RFID Scanner, and a PC/SC-Like device.

EC40) The method of EC39, wherein the activating exposes selective ones of the portions.

EC41) The method of EC39, wherein the activating enables selective ones of the portions to be visible and selective others of the portions to be invisible.

EC42) The method of EC37, wherein the polymorphic GATT table is compiled using capabilities.

EC43) The method of EC42, wherein the capabilities are compatible with at least the Silicon Labs SDK 2.4.0.

EC44) The method of EC5, wherein prior to the monitoring, the BLE connection profile state bits correspond to activation of a GATT table corresponding to a non-HID BLE connection profile.

EC45) The method of EC44, wherein after the selectively modifying, the BLE connection profile state bits correspond to activation of a GATT table corresponding to an HID BLE connection profile.

EC46) The method of EC1, wherein the low-energy radio connection profile state bits are maintained across a power cycle of the low-energy radio peripheral.

EC47) The method of EC46, wherein the low-energy radio peripheral comprises a non-volatile memory, and at least a portion of the profile state bits are stored in the non-volatile memory.

EC48) The method of EC1, wherein after a reboot, the low-energy radio peripheral operates in a particular low-energy radio connection profile in response to the low-energy radio peripheral reading a particular configuration card prior to the reboot.

EC49) A low-energy radio peripheral comprising:
a processor;
a non-volatile memory enabled to simultaneously store a plurality of generic attribute profile tables;
a low-energy radio engine operable in accordance with an active one of the generic attribute profile tables;
one or more user-input elements;
wherein the processor is enabled to detect a special buttons event indicated by the user-input elements; and
wherein the processor is further enabled, in response to the special buttons event, to change the active generic attribute profile table from a previous one of the generic attribute profile tables to a current one of the generic attribute profile tables.

EC50) The peripheral of EC49, wherein:
the low-energy radio peripheral is a BLE peripheral,
the low-energy radio engine comprises a BLE engine, and
the active generic attribute profile table comprises an active BLE GATT table.

EC51) The peripheral of EC49, wherein the BLE peripheral is compatible with at least version 4.2 of the Bluetooth Specification.

EC52) The peripheral of EC49, wherein the special buttons event comprises a power on of the low-energy radio peripheral with the user-input elements sequenced in a particular manner.

EC53) The peripheral of EC52, wherein the processor is further enabled, in response to a power on of the low-energy radio peripheral without the user-input elements sequenced in a particular manner, to leave the active generic attribute profile table unchanged.

EC54) The peripheral of EC52, wherein the processor is further enabled, in response to a power off of the low-energy radio peripheral, to leave the active generic attribute profile table unchanged.

EC55) The peripheral of EC50, wherein the active BLE GATT table corresponds to a BLE non-HID connection profile and the current generic attribute profile table corresponds to a BLE HID connection profile.

EC56) The peripheral of EC50, wherein the active GATT table corresponds to a BLE connection profile describing one or more of an RFID Scanner and a PC/SC-Like device.

EC57) The peripheral of EC50, wherein the active GATT table corresponds to a combination BLE connection profile describing an RFID Scanner and a PC/SC-Like device.

EC58) The peripheral of EC57, wherein the combination BLE connection profile comprises at least one BLE characteristic corresponding to the RFID Scanner and at least one BLE characteristic corresponding to the PC/SC-Like device.

EC59) The peripheral of EC58, wherein a BLE peripheral application executing on a wireless host external to the BLE peripheral connects with the BLE peripheral using the combination BLE connection profile.

EC60) The peripheral of EC59, wherein the application is enabled to treat the BLE peripheral as a selected one of an RFID Scanner and a PC/SC-Like device via connecting to a respectively corresponding BLE characteristic.

EC61) The peripheral of EC59, wherein the BLE peripheral operates as an RFID Scanner when the application connects to the at least one BLE characteristic corresponding to the RFID Scanner.

EC62) The peripheral of EC59, wherein the BLE peripheral operates as a PC/SC-Like device when the application connects to the at least one BLE characteristic corresponding to the PC/SC-Like device.

EC63) The peripheral of EC50, wherein after a reboot, the BLE peripheral operates in a particular BLE connection profile in response to a BLE peripheral application executing on a wireless host external to the BLE peripheral and specifying the particular BLE connection profile prior to the reboot.

EC64) The peripheral of EC49, wherein information identifying the active generic attribute profile table is stored in configuration registers of the processor.

EC65) The peripheral of EC49, wherein the low-energy radio peripheral is handheld.

EC66) The peripheral of EC49, wherein the low-energy radio peripheral is enabled to read one or more of wireless tags and optical scan targets.

EC67) The peripheral of EC66, wherein the wireless tags include one or more of NFC tags and RFID tags.

EC68) The peripheral of EC66, wherein the optical scan targets include one or more of QR codes and linear barcodes.

EC69) The peripheral of EC49, wherein reflashing the low-energy radio engine is not required to change between connection profiles.

EC70) The peripheral of EC50, wherein the plurality of generic attribute profile tables is a polymorphic GATT table.

EC71) The peripheral of EC70, wherein the polymorphic GATT table comprises portions corresponding to one or more of an HID, an RFID Scanner, and a PC/SC-Like device.

EC72) The peripheral of EC70, wherein the polymorphic GATT table comprises portions corresponding to an HID, an RFID Scanner, and a PC/SC-Like device.

EC73) The peripheral of EC72, wherein the changing exposes selective ones of the portions.

EC74) The peripheral of EC72, wherein the changing enables selective ones of the portions to be visible and selective others of the portions to be invisible.

EC75) The peripheral of EC70, wherein the polymorphic GATT table is compiled using capabilities.

EC76) The peripheral of EC75, wherein the capabilities are compatible with at least the Silicon Labs SDK 2.4.0.

EC77) The peripheral of EC49, wherein after a reboot, the low-energy radio peripheral operates in a particular low-energy radio connection profile in response to the low-energy radio peripheral reading a particular configuration card prior to the reboot.

System

FIG. 1 illustrates, via a structural system perspective, embodiments of a peripheral device employing wireless connection profiles, as System 1000. In some embodiments, a system comprises NRRW 1300 (a NFC/RFID Reader & Writer), Management/Point-Of-Sale Host 1400 (or equivalent computing device), and Customer devices, such as a Mobile or Wearable device 1500, and/or Coupon, Card, or Object 1800. In various embodiments, Management/Point-Of-Sale Host 1400 is intended to represent a central device, with NRRW 1300 representing a peripheral device.

In some embodiments, NRRW 1300 is an NFC/RFID tag cordless hand reader/writer, optimized to operatively read/write NFC and/or RFID targets while being wielded by one hand, and comprises NFC/RFID-Engine 1211 enabled to read and/or write NFC and/or RFID tags. Radio Subsystem 1320 comprises a low-energy Bluetooth radio (BLE) enabled to communicate with Management/Point-Of-Sale Tablet 1400 for receiving configuration commands and for communication of, and status about, decoded NFC and/or RFID targets and various other types of targets. In some embodiments, NRRW 1300 is integral to a terminal stand and is not removable. In some embodiments, NRRW 1300 includes a cordless hand scanner, optimized to operatively scan optical targets while being wielded by one hand, and comprises an optical scan engine, enabled to read optical bar codes of various types. In various embodiments, NRRW 1300 is selectively operable as an NFC/RFID tag cordless hand reader and/or a cordless hand scanner.

Management/Point-Of-Sale Host 1400 comprises Processor 1420, Radio Subsystem 1401, Buttons 1405, Display 1404, Nonvolatile storage 1406, Program Storage 1407, and according to embodiment Database Storage 1410. In some embodiments, Management/Point-Of-Sale Tablet 1400 is an Apple iPad running inter alia a Point-Of-Sale (POS) application on top of an Apple IOS operating system. In some embodiments, Management/Point-Of-Sale Tablet 1400 is an Android-compatible device (such as a tablet) running inter alia a Point-Of-Sale (POS) application on top of an Android operating system. In some embodiments, Management/Point-Of-Sale Tablet 1400 is a Windows-compatible device (such as a tablet) running inter alia a Point-Of-Sale (POS) application on top of a Windows operating system. In some embodiments, Radio Subsystem 1401 comprises a WiFi radio and a dual-mode Classic/BLE Bluetooth radio. In some embodiments, the WiFi radio is to communicate via Private WiFi Hot Spot/Router 1601 and Private LAN 1600 with Private Local Server 1605 to access Database Storage 1610. In some embodiments having one or more elements of Off-site 1750, Tablet 1400 optionally also communicates via Internet 1700 with Private Remote Server 1705 to access Database Storage 1710. The various Database Storage instances 1410, 1610, and 1710, are optionally used according to embodiment for one or more of syncing, backup, or caching of database subsets, in accordance with well-known methods.

Mobile or Wearable 1500 is intended to represent one of either a mobile device (such as a smartphone, or tablet, generally having a display) or a wearable device (such as a watch or fitness band, having a small or no display according to embodiment). According to embodiment, Mobile or Wearable 1500 comprises one or more of Radio Subsystem 1501, NFC Engine 1502, NFC Non-volatile Memory (NFC NVM) 1503, Display 1504, Buttons 1505, and NV Storage 1506. In some embodiments, Mobile or Wearable 1500 is a selected one of an IOS smartphone, an Android smartphone, a Windows smartphone, a BlackBerry smartphone, an Apple Watch, a Sony Smartwatch, or an NFC smart wristband, ring, bracelet, necklace, or other jewelry. According to embodiment, Radio Subsystem 1501 is enabled to receive Beacon information (such as from a BLE radio of another agent of FIG. 1) via, e.g., an included Bluetooth/BLE capability. According to embodiment, mobile devices optionally and/or selectively connect to Internet 1700 either via an integral cellular connection or via Public WiFi Hot Spot/Router 1701. Access to the Public Hot Spot is variously unrestricted, provided as a general customer courtesy, or selectively provided as part of a customer loyalty program (for example, to those Customers that have installed the customer loyalty application, or have met other predetermined customer loyalty criteria), according to embodiment and/or usage scenario.

In various embodiments, Coupon, Card, or Object 1800 is intended to represent one of either an e.g., credit-card sized electronic identity card (such as used for access, transit, and banking) or a printed-paper coupon. According to embodiment, Coupon, Card, or Object 1800 comprises one or more of NFC Tag 1803 or Contactless SmartCard Chip 1805. In some embodiments, Coupon, Card, or Object 1800 is a selected one of an NFC Loyalty Card, a printed coupon, a QR Code Loyalty Card, or an Oyster Card. In various embodiments, Coupon, Card, or Object 1800 is intended to represent any type of NFC tag and/or RFID tag. In various embodiments, Coupon, Card, or Object 1800 is intended to represent any type barcode, e.g., optical barcode such as linear barcode, a 2D barcode, or a QR barcode.

Figure 2:
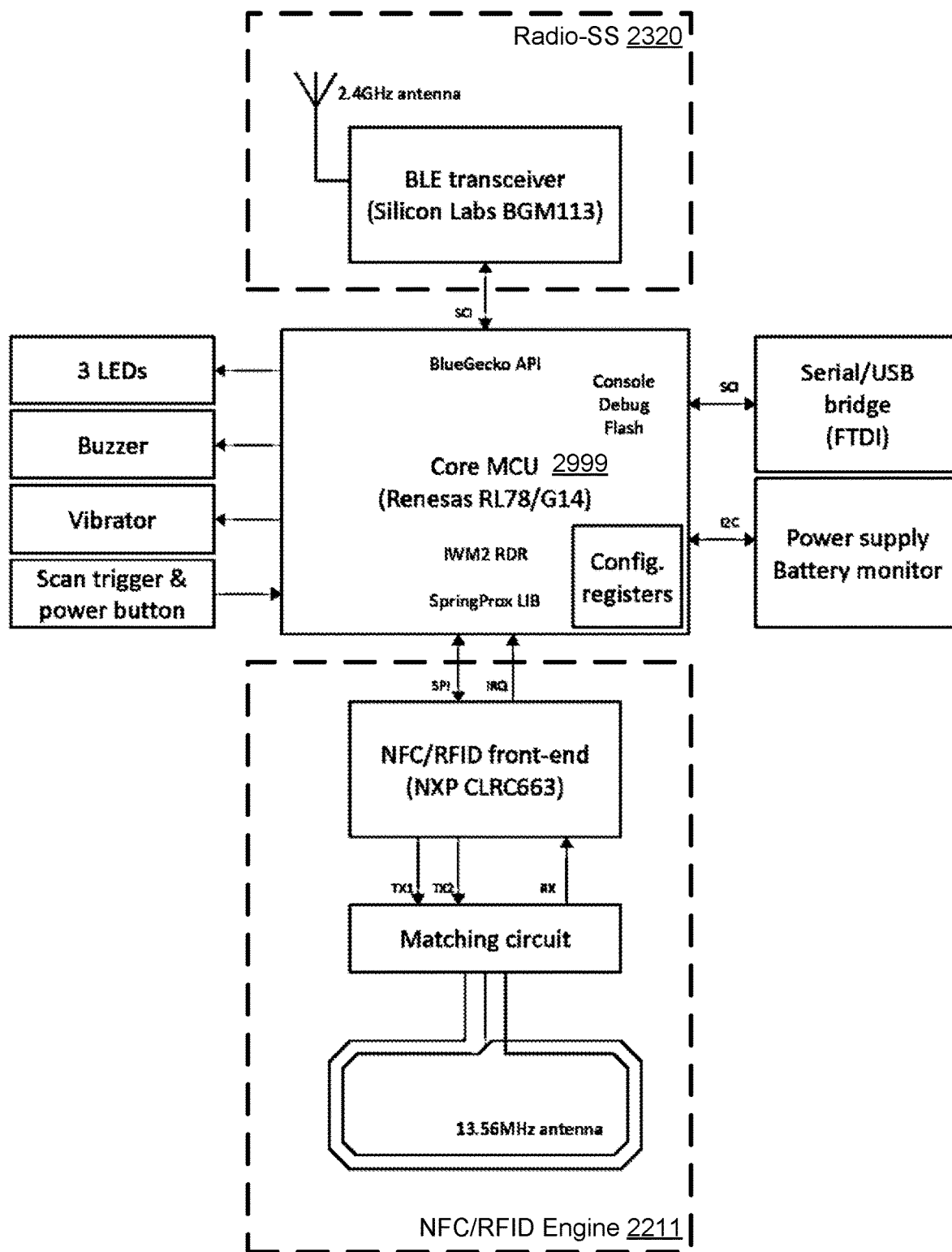
FIG. 2 illustrates, via a structural block diagram perspective, embodiments of a peripheral device comprising any combination of a Near Field Communication (NFC) tag reader and/or writer and a Radio Frequency IDentification (RFID) reader and/or writer.

FIG. 2 illustrates, via a structural perspective, embodiments of a peripheral device comprising any combination of a Near Field Communication (NFC) tag reader and/or writer and a Radio Frequency IDentification (RFID) reader and/or writer. In various embodiments and/or usage scenarios, any one or more elements and/or portions thereof of FIG. 2 correspond to any one or more elements and/or portions thereof of NRRW 1300 of FIG. 1. As a specific example, Radio-SS 2320 corresponds, in some embodiments, to all or any portions of Radio-SS 1320 of FIG. 1. As another specific example, NFC/RFID-Engine 2211 corresponds, in some embodiments, to all or any portions of NFC/RFID-Engine 1211 of FIG. 1. In some embodiments, Core MCU 2999 comprises one or more NVMs and the core is enabled to execute code stored in the NVMs.

Figure 3:
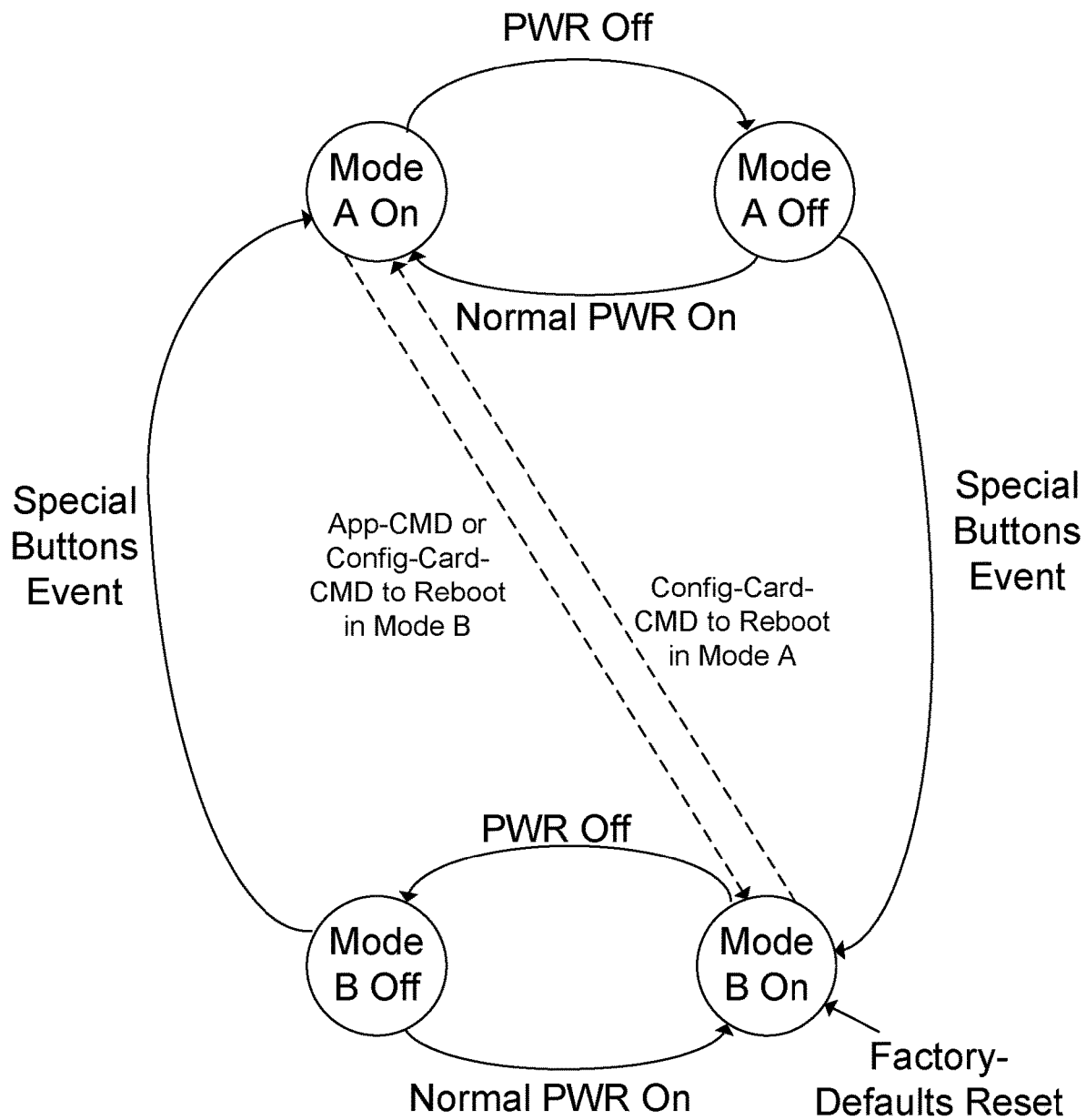
FIG. 3 illustrates, via an abstract state diagram, selected operating details of embodiments of the peripheral device of FIGS. 1 and 2.

FIG. 3 illustrates selected operating details of embodiments of peripheral device NRRW 1300. In some embodiments, the MCU of FIG. 2 implements the overall behavior of FIG. 3, the two modes having corresponding profile state bits maintained in the MCU Config. Registers. In FIG. 3, Mode A corresponds to an Application Mode while Mode B corresponds to a Basic Mode, where the two modes refer to connection profiles for low-energy communications. In some embodiments the low-energy communications connection profiles are BLE connection profiles. Basic Mode refers to a Human Interface Device (HID) connection profile. When activated using the HID profile, NRRW 1300 appears like a keyboard to Management/Point-Of-Sale/Host 1400. That is, the data read from NFC/RFID tags is formatted and transmitted by the NRRW 1300 as keystrokes when using Basic Mode. Accordingly, the NRRW 1300 is usable for entering data read from NFC/RFID-tags into productivity applications or other non-peripheral-specific software (just as data might be entered by keyboard) by Management/Point-Of-Sale Host 1400 without any peripheral-application-specific software. Application Mode refers to connection profiles other than the HID profile, and which require peripheral-application-specific software to be installed on Management/Point-Of-Sale Host 1400.

The embodiment of FIG. 3 illustrates NRRW 1300 as being reset by the factory to Mode B. NRRW 1300 stays in Mode B through power cycles, unless particular events happen. On power up, a particular special button combination event (AKA Special Buttons Event) will transition NRRW 1300 to Mode A. In some embodiments, on power up, holding down the power button along with a trigger button for 10 seconds, is used as the Special Buttons Event. Other special button combinations or button sequences are contemplated for other embodiments. Separately in some embodiments, a configuration card (having an NFC/RFID-tag) can be read while in Mode B, wherein the configuration card is programmed with one or more commands to signal the NRRW 1300 to immediately reboot into Mode A. Applicable to each reboot mentioned throughout the discussion of FIGS. 3 and 4, in some embodiments and scenarios, only Radio-SS 2320 is rebooted.

NRRW 1300 stays in Mode A through power cycles, unless particular events happen. On power up, the same Special Buttons Event will transition NRRW 1300 to Mode B. Separately in some embodiments, a configuration card can be read while in Mode A, wherein the configuration card is programmed with one or more commands to signal the NRRW 1300 to immediately reboot into Mode B. Also in some embodiments, the application specific software executing on Management/Point-Of-Sale Host 1400 is enabled to send one or more commands to signal the NRRW 1300 to immediately reboot into Mode B.

In some embodiments, the HID profile of the Basic Mode (AKA Mode B) conforms to a stand-alone basic HID profile compatible with the OS of the Management/Point-Of-Sale/Host 1400, and does not contain services and characteristics for other connection profiles. An example of such a stand-alone HID profile is found in Appendix IV. This is done in part to insure that NRRW 1300 is usable "out of the box" without requiring peripheral-application-specific software to be installed on Management/Point-Of-Sale Host 1400. As NRRW 1300 returns to Basic Mode following a reset to factory defaults, a basic HID profile also facilitates and simplifies basic testing of the NRRW 1300 should a customer experience difficulties in Application Mode. Unlike Application Mode, no peripheral-application-specific software is required. Basic Mode is adequate for RFID tags containing small amounts of data.

According to embodiment, the connection profile of the Application Mode (AKA Mode A) corresponds to a stand-alone (single) non-HID device profile or a combination of a plurality of non-HID profiles. Example non-HID devices include an RFID Scanner (AKA Reader, AKA RDR) and a mobile-OS-adapted quasi Personal Computer/Smart Card device (a "PC/SC-like" device). An example of a stand-alone RDR connection profile is found in Appendix II. An example of a stand-alone PC/SC-like device connection profile is found in Appendix III.

In particular embodiments, the Application Mode corresponds to a combination RDR+PC/SC-like connection profile, that includes the services and characteristics for both a RDR device and a PC/SC-like device. The peripheral-application-specific software is able to treat the NRRW 1300 as a selected one of an RFID Scanner or a PC/SC-like device by connecting to a respectively corresponding characteristic.

When using the RDR connection profile characteristics, the NRRW 1300 is enabled to collect small pieces of data from NFC/RFID tags. This could be either the tag's serial number or static data stored somewhere in the tag's memory. Once a tag has been read, the NRRW 1300 transmits the formatted data through a single-way BLE stream to peripheral-application-specific software running in the Management/Point-Of-Sale/Host 1400. Compared to the HID profile, use of the RDR connection profile offers more efficient and reliable data communications for RFIDs containing lots of data. Compared to the PC/SC-like connection profile, use of the RDR connection profile offers an easier environment for development of the peripheral-application-specific software, as a plurality of processing templates are provided (for execution on the NRRW 1300) that define a plurality of active tag technologies and how the data is fetched and formatted.

When using the PC/SC-like connection profile characteristics, the NRRW 1300 mimics the features of a contactless smart card coupler—it behaves as a "dumb" bidirectional gateway between peripheral-application-specific software running in the Management/Point-Of-Sale/Host 1400 and an application running in a contactless smart card. The peripheral-application-specific software is able to use the NRRW 1300 to implement any transaction that the contactless smart card allows, including NRRW-companion-SDK-enabled functions to support Read and Write capabilities.

Figure 4:
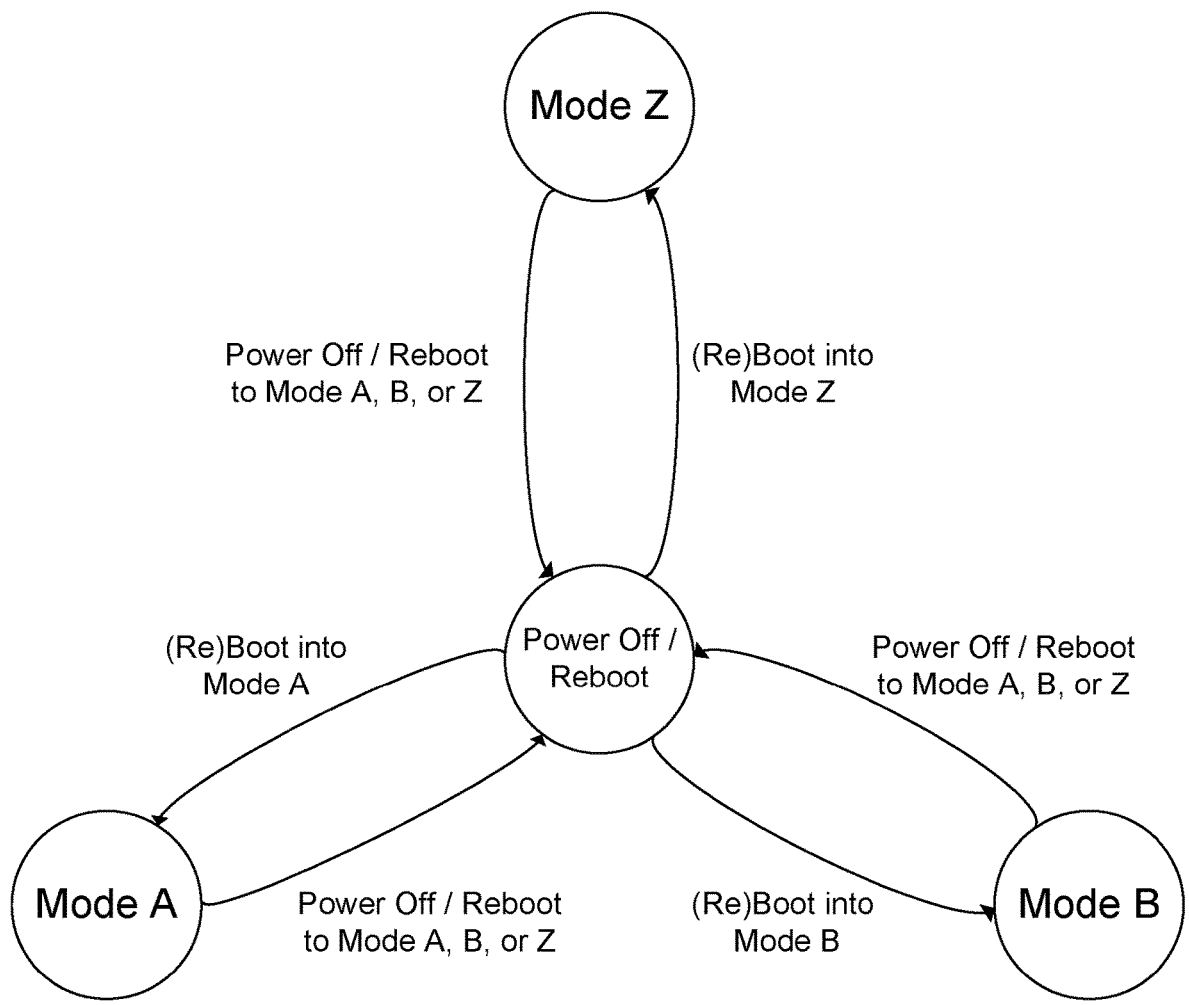
FIG. 4 illustrates, via an abstract state diagram, selected operating details of additional embodiments of the peripheral device of FIGS. 1 and 2.

FIG. 3 illustrates a plurality of modes, Mode A and Mode B, and the same Special Buttons Event toggles the NRRW 1300 between the two modes on reboot. In other embodiments, the plurality of modes is extended. For example, a new Mode Z is added, as illustrated in FIG. 4. In FIG. 4, certain details of FIG. 3 have been suppressed to draw the reader's focus on the addition of Mode Z. For example, it is understood that there is additional per-mode state (shown in FIG. 3, but omitted in FIG. 4) used according to scenario to establish which mode is entered following a Reboot/Power On. The same Special Buttons Event serves to sequentially loop the NRRW 1300 from Mode B to Mode A, from Mode A to Mode Z, and from Mode Z back to Mode B. In this scenario, Mode B remains a Basic Mode with an HID profile, while Mode A is a first Application Mode with a first non-HID profile and Mode Z is a second Application Mode with a second non-HID profile. In other scenarios, Mode B remains a Basic Mode with an HID profile, while Mode A is a first Application Mode with a first non-HID profile and Mode Z is an update mode with a second non-HID profile. In other embodiments, respective unique special button combinations are defined to permit directed reboot of the NRRW 1300 into a particular mode.

In some embodiments the low-energy communications connection profiles are BLE connection profiles compatible with at least Bluetooth version 4.2. In the NRRW 1300, the BLE transceiver in Radio-SS 2320 of FIG. 2 implements a particular BLE connection profile based on activation of a corresponding Bluetooth Generic Attribute Profile (GATT or GATT table), a type of database file. A traditional (non-Polymorphic) GATT defines services and characteristics associated with a single particular device.

Connection profile state bits maintained by the MCU of FIG. 2 specify a particular connection profile. In accordance with the above description of FIG. 3, the state bits are changed as a result of various events indicating a desire to change connection profiles. In some embodiments, separate traditional GATT tables exist for each connection profile. To change modes, a replacement connection profile is re-flashed into an NVM of the BLE transceiver.

In some embodiments, the GATT is a so-called Polymorphic GATT, enabled by use of Silicon Labs Blue Gecko SDK 2.4 or later along with a BLE transceiver compatible with the Silicon Labs "Blue Gecko" architecture such as the Silicon Labs BGM113 or BGM111. Such Polymorphic GATTs use constructs called capabilities to selectively activate (toggle the visibility of) sub-portions of the GATT. This enables a single unified database file (GATT) to include services and characteristics for multiple connection profiles. In a particular embodiment, a single unified Polymorphic GATT has services and characteristics for both the HID connection profile and the combined RDR+PC/SC-like connection profile. An example of such a Polymorphic GATT is found in Appendix I. On power up, the MCU determines the desired connection profile as previously explained and commands the BLE transceiver to selectively activate (make visible and thus enable) only those capabilities in the Polymorphic GATT that correspond to the desired connection profile. The Polymorphic GATT enables changing connection profiles by merely rebooting the Radio-SS 2320 of the NRRW 1300, and eliminates the need to re-flash the embedded NVM of the BLE transceiver. As re-flashing is considered a risky operation, is a generally inconvenient, tedious, and/or stressful process for the user, and also likely reduces the lifetime of the NVM, minimizing re-flashing is clearly advantageous.

Appendix I

An Appendix I (labeled "Appendix I" on the first page) is attached to this application and is incorporated by reference herein for all purposes in this application. The Appendix further describes embodiments of techniques applicable to peripheral device wireless connection profiles. Appendix I provides an illustrative "Polymorphic" GATT in xml, including an HID sub-portion and a combined RDR+PC/SC-like device sub-portion.

Appendix II

An Appendix II (labeled "Appendix II" on the first page) is attached to this application and is incorporated by reference herein for all purposes in this application. The Appendix further describes embodiments of techniques applicable to peripheral device wireless connection profiles. Appendix II provides an illustrative single device (non-Polymorphic) RDR GATT in xml.

Appendix III

An Appendix III (labeled "Appendix III" on the first page) is attached to this application and is incorporated by reference herein for all purposes in this application. The Appendix further describes embodiments of techniques applicable to peripheral device wireless connection profiles. Appendix III provides an illustrative single device (non-Polymorphic) PC/SC-like device GATT in xml.

Appendix IV

An Appendix IV (labeled "Appendix IV" on the first page) is attached to this application and is incorporated by reference herein for all purposes in this application. The Appendix further describes embodiments of techniques applicable to peripheral device wireless connection profiles. Appendix IV provides an illustrative single device (non-Polymorphic) HID GATT in xml.

CONCLUSION

Certain choices have been made in the description merely for convenience in preparing the text and drawings and unless there is an indication to the contrary the choices should not be construed per se as conveying additional information regarding structure or operation of the embodiments described. Examples of the choices include: the particular organization or assignment of the designations used for the figure numbering and the particular organization or assignment of the element identifiers (the callouts or numerical designators, e.g.) used to identify and reference the features and elements of the embodiments.

The words "includes" or "including" are specifically intended to be construed as abstractions describing logical sets of open-ended scope and are not meant to convey physical containment unless explicitly followed by the word "within." Language in the claims or elsewhere herein of the form of "at least one of A, . . . , and N" or "one or more of A, . . . , and N" and minor variations thereof should be understood to mean "one or more selected from the group of A, . . . , and N" (where ellipsis indicates an arbitrary plurality of group members). Furthermore, without express indication to the contrary such language is not meant to alter the open-ended scope of a claim or claim element.

Although the foregoing embodiments have been described in some detail for purposes of clarity of description and understanding, the invention is not limited to the details provided. There are many embodiments of the invention. The disclosed embodiments are exemplary and not restrictive.

It will be understood that many variations in construction, arrangement, and use are possible consistent with the description, and are within the scope of the claims of the issued patent. For example, interconnect and function-unit bit-widths, clock speeds, and the type of technology used are variable according to various embodiments in each component block. The names given to interconnect and logic are merely exemplary, and should not be construed as limiting the concepts described. The order and arrangement of flowchart and flow diagram process, action, and function elements are variable according to various embodiments. Also, unless specifically stated to the contrary, value ranges specified, maximum and minimum values used, or other particular specifications (such as flash memory technology types; and the number of entries or stages in registers and buffers), are merely those of the described embodiments, are expected to track improvements and changes in implementation technology, and should not be construed as limitations.

Functionally equivalent techniques known in the art are employable instead of those described to implement various components, sub-systems, operations, functions, routines, sub-routines, in-line routines, procedures, macros, or portions thereof. It is also understood that many functional aspects of embodiments are realizable selectively in either hardware (i.e., generally dedicated circuitry) or software (i.e., via some manner of programmed controller or processor), as a function of embodiment dependent design constraints and technology trends of faster processing (facilitating migration of functions previously in hardware into software) and higher integration density (facilitating migration of functions previously in software into hardware). Specific variations in various embodiments include, but are not limited to: differences in partitioning; different form factors and configurations; use of different operating systems and other system software; use of different interface standards, network protocols, or communication links; and other variations to be expected when implementing the concepts described herein in accordance with the unique engineering and business constraints of a particular application.

The embodiments have been described with detail and environmental context well beyond that required for a minimal implementation of many aspects of the embodiments described. Those of ordinary skill in the art will recognize that some embodiments omit disclosed components or features without altering the basic cooperation among the remaining elements. It is thus understood that much of the details disclosed are not required to implement various aspects of the embodiments described. To the extent that the remaining elements are distinguishable from the prior art, components and features that are omitted are not limiting on the concepts described herein.

All such variations in design are insubstantial changes over the teachings conveyed by the described embodiments. It is also understood that the embodiments described herein have broad applicability to other computing and networking applications, and are not limited to the particular application or industry of the described embodiments. The invention is thus to be construed as including all possible modifications and variations encompassed within the scope of the claims of the issued patent.

What is claimed is:

1. A method of operating a low-energy radio peripheral enabled to communicate with a wireless host, the method comprising:
    in response to a startup event, monitoring by a processing element of the low-energy radio peripheral for a special buttons event;
    subsequent to the monitoring, selectively modifying low-energy radio connection profile state bits maintained by the processing element,
    wherein during the selectively modifying, the low-energy radio connection profile state bits are modified in response to a detection of a special buttons event, and
    wherein during the selectively modifying, the low-energy radio connection profile state bits are not modified in response to the absence of a special buttons event during the monitoring;
    subsequent to the selectively modifying, in accordance with the low-energy radio connection profile state bits, activating a corresponding generic attribute profile table in a low-energy radio engine of the low-energy radio peripheral; and
    wherein the corresponding generic attribute profile table
        is one of a plurality of generic attribute profile tables of the low-energy radio peripheral,
        determines behavior of the low-energy radio peripheral as viewed by the wireless host as a selected corresponding one of a plurality of peripheral behaviors, and
        includes services and characteristics for the corresponding peripheral behavior.

2. The method of claim 1, wherein the low-energy radio peripheral comprises a low-energy Bluetooth radio peripheral, the low-energy radio connection profile state bits comprise low-energy Bluetooth radio connection profile state bits, the low-energy radio engine comprises a low-energy Bluetooth radio engine, and the corresponding generic attribute profile table comprises a low-energy Bluetooth radio Generic Attribute Profile table.

3. The method of claim 1, wherein the low-energy Bluetooth radio Generic Attribute Profile table corresponds to a Human Interface Device low-energy Bluetooth radio connection profile and the behavior of the low-energy radio peripheral as viewed by the wireless host is that of a Human Interface Device.

4. The method of claim 3, wherein the wireless host connects with the low-energy Bluetooth radio peripheral using the Human Interface Device low-energy Bluetooth radio connection profile.

5. The method of claim 4, wherein the low-energy Bluetooth radio peripheral appears as a keyboard to the wireless host.

6. The method of claim 1, wherein the low-energy Bluetooth radio Generic Attribute Profile table corresponds to a combination low-energy Bluetooth radio connection profile describing a Radio Frequency IDentification Scanner and a Personal Computer/Smart Card like device.

7. The method of claim 6, wherein the combination low-energy Bluetooth radio connection profile comprises at least one low-energy Bluetooth radio characteristic corresponding to the Radio Frequency IDentification Scanner and at least one low-energy Bluetooth radio characteristic corresponding to the Personal Computer/Smart Card like device.

8. The method of claim 7, wherein a low-energy Bluetooth radio peripheral application executing on the wireless host connects with the low-energy Bluetooth radio peripheral using the combination low-energy Bluetooth radio connection profile.

9. The method of claim 8, wherein the low-energy Bluetooth radio peripheral application is enabled to treat the low-energy Bluetooth radio peripheral as a selected one of the Radio Frequency IDentification Scanner and the Personal Computer/Smart Card like device via connecting to a respectively corresponding low-energy Bluetooth radio characteristic.

10. The method of claim 8, wherein the low-energy Bluetooth radio peripheral operates as the Radio Frequency IDentification Scanner when the low-energy Bluetooth radio peripheral application connects to the at least one low-energy Bluetooth radio characteristic corresponding to the Radio Frequency IDentification Scanner.

11. The method of claim 8, wherein the low-energy Bluetooth radio peripheral operates as the Personal Computer/Smart Card like device when the low-energy Bluetooth radio peripheral application connects to the at least one low-energy Bluetooth radio characteristic corresponding to the Personal Computer/Smart Card like device.

12. The method of claim 1, wherein after a reboot, the low-energy Bluetooth radio peripheral operates in a particular low-energy Bluetooth radio connection profile in response to a low-energy Bluetooth radio peripheral application executing on the wireless host and specifying the particular low-energy Bluetooth radio connection profile prior to the reboot.

13. The method of claim 1, wherein the low-energy Bluetooth radio Generic Attribute Profile table is a polymorphic Generic Attribute Profile table.

14. The method of claim 13, wherein the polymorphic Generic Attribute Profile table comprises portions corresponding to a Human Interface Device, a Radio Frequency IDentification Scanner, and a Personal Computer/Smart Card like device.

15. The method of claim 14, wherein the activating enables selective ones of the portions to be visible and selective others of the portions to be invisible.

16. A low-energy radio peripheral, operable with a wireless host, the low-energy radio peripheral comprising:
a processor;
a non-volatile memory enabled to simultaneously store a plurality of generic attribute profile tables;
a low-energy radio engine operable in accordance with an active one of the generic attribute profile tables;
one or more user-input elements;
wherein the processor is enabled to detect a special buttons event indicated by the user-input elements;
wherein the processor is further enabled, in response to the special buttons event, to change the active generic attribute profile table from a previous one of the generic attribute profile tables to a current one of the generic attribute profile tables;
wherein the previous generic attribute profile table
is a first one of the generic attribute profile tables,
determines behavior of the low-energy radio peripheral as viewed by the wireless host as a first one of a plurality of peripheral behaviors, and
includes services and characteristics for the first peripheral behavior; and
wherein the current generic attribute profile table
is a second one of the generic attribute profile tables,
determines behavior of the low-energy radio peripheral as viewed by the wireless host as a second one of the peripheral behaviors, and
includes services and characteristics for the second peripheral behavior.

17. The peripheral of claim 16, wherein:
the low-energy radio peripheral is a low-energy Bluetooth radio peripheral,
the low-energy radio engine comprises a low-energy Bluetooth radio engine, and
the active generic attribute profile table comprises an active low-energy Bluetooth radio Generic Attribute Profile table.

18. The peripheral of claim 16, wherein the special buttons event comprises a power on of the low-energy radio peripheral with the user-input elements sequenced in a particular manner.

19. The peripheral of claim 17, wherein the active low-energy Bluetooth radio Generic Attribute Profile table corresponds to a combination low-energy Bluetooth radio connection profile describing a Radio Frequency IDentification Scanner and a Personal Computer/Smart Card like device.

20. The peripheral of claim 19, wherein the combination low-energy Bluetooth radio connection profile comprises at least one low-energy Bluetooth radio characteristic corresponding to the Radio Frequency IDentification Scanner and at least one low-energy Bluetooth radio characteristic corresponding to the Personal Computer/Smart Card like device.

21. The peripheral of claim 20, wherein a low-energy Bluetooth radio peripheral application executing on the wireless host connects with the low-energy Bluetooth radio peripheral using the combination low-energy Bluetooth radio connection profile.

22. The peripheral of claim 21, wherein the low-energy Bluetooth radio peripheral operates as the Radio Frequency IDentification Scanner when the low-energy Bluetooth radio peripheral application connects to the at least one low-energy Bluetooth radio characteristic corresponding to the Radio Frequency IDentification Scanner.

23. The peripheral of claim 21, wherein the low-energy Bluetooth radio peripheral operates as the Personal Computer/Smart Card like a device when the low-energy Bluetooth radio peripheral application connects to the at least one low-energy Bluetooth radio characteristic corresponding to the Personal Computer/Smart Card like device.

24. The peripheral of claim 17, wherein after a reboot, the low-energy Bluetooth radio peripheral operates in a particular low-energy Bluetooth radio connection profile in response to a low-energy Bluetooth radio peripheral application executing on the wireless host and specifying the particular low-energy Bluetooth radio connection profile prior to the reboot.

\* \* \* \* \*